(12) United States Patent
Inoue et al.

(10) Patent No.: US 6,179,732 B1
(45) Date of Patent: Jan. 30, 2001

(54) GOLF BALL AND GOLF BALL MARKING METHOD

(75) Inventors: Michio Inoue; Keisuke Ihara, both of Chichibu (JP)

(73) Assignee: Bridgestone Sports Co., Ltd., Tokyo (JP)

( * ) Notice: Under 35 U.S.C. 154(b), the term of this patent shall be extended for 0 days.

(21) Appl. No.: 09/212,276

(22) Filed: Dec. 16, 1998

(30) Foreign Application Priority Data

Dec. 16, 1997 (JP) .................................................. 9-363591

(51) Int. Cl.[7] .................................................. A63B 57/00
(52) U.S. Cl. .................................................. 473/409; 473/378
(58) Field of Search .................................................. 473/367, 409; 40/327; 264/73, 74; 101/491, 492, DIG. 40

(56) References Cited

U.S. PATENT DOCUMENTS

| | | | |
|---|---|---|---|
| 758,851 | * 5/1904 | Richards .................................................. | 473/367 |
| 5,005,838 | * 4/1991 | Oka .................................................. | 40/327 |
| 5,503,699 | * 4/1996 | Ratner et al. .................................................. | 40/327 |
| 5,788,890 | * 8/1998 | Grey et al. .................................................. | 264/73 |

* cited by examiner

Primary Examiner—Jeanette Chapman
Assistant Examiner—Raeann Gorden
(74) Attorney, Agent, or Firm—Sughrue, Mion, Zinn, Macpeak & Seas, PLLC

(57) ABSTRACT

Markings are imparted to the surface of a golf ball at the same time as the ball is molded in a two-part mold having an inner wall defining a spherical cavity. A is provided on the cavity-defining wall of the mold, and the cavity is then filled with a molding material. Also disclosed is a marking method which includes affixing a mark bearing film to the surface of a covered body comprising a core enclosed within a pair of half-cups, then compression molding the covered body. Markings can easily and efficiently be applied to a golf ball without compromising the uniformity of the dimple shapes on the ball surface.

13 Claims, 2 Drawing Sheets

GOLF BALL AND GOLF BALL MARKING METHOD

BACKGROUND OF THE INVENTION

1. Field of the Invention

The present invention relates to an easy and efficient method for marking a golf ball without deforming the dimples on the ball. It also relates to a golf ball which is marked by this method at the same time as it is molded.

2. Related Art

Golf balls have a plurality of dimples on the surface, and marks such as the manufacturer's name, the brand name, figures, and numbers are displayed on the dimpled curved surface of the ball.

A golf ball is generally molded using a two-part mold having inner walls which define a cavity at the interior and which are provided with a plurality of dimple-forming projections. The golf ball thus molded is trimmed of cover stock flash, buffed, and surface treated, after which marking is carried out in a separate marking step.

As shown in FIG. 4, conventional golf ball marking methods carried out for this purpose involve placing a transfer tape 41 bearing the markings to be displayed on the ball between the ball G and a transfer pad 42, closing in on the ball G from both sides (in the direction of the arrows I in the diagram), and applying high pressure against the dimpled curved surface of the ball at an elevated temperature so as to effect transfer of the marks. The transfer pad 42 is supported by a support 43 which is held by a platen 44.

However, since the marking method using a transfer tape effects transfer at a high temperature and under a strong pushing force, the dimples are deformed during transfer. Even after transfer has been completed, the dimples remain deformed rather than reverting completely to their original shape. As a result, the dimple shapes on the ball's surface lose their uniformity, which adversely affects the flight performance of the ball.

SUMMARY OF THE INVENTION

Accordingly, one object of the present invention is to provide a golf ball marking method which is able to apply markings to a golf ball easily, efficiently, and with a high degree of freedom as to the marking position, without any accompanying loss in the uniformity of the dimple shapes. Another object of this invention is to provide a golf ball which is marked by this method at the same time as it is molded.

The invention achieves these objects by providing a method for imparting markings to a golf ball surface, comprising the steps of furnishing a two-part mold having an inner wall defining a spherical cavity and parting at a position that divides the cavity into two substantially equal parts, providing a marking means on the cavity-defining wall of the mold, and filling the mold cavity with a molding material so as to display the markings on the surface of the golf ball. The marking means in the golf ball marking method of the invention is typically a mark-bearing film which integrally fuses with the surface of the ball to effect marking, or markings on the cavity-defining wall of the mold which are transferred to the surface of the ball to effect marking. The mold used in the inventive method is typically an injection mold or a compression mold.

Markings can thus be applied to the surface of a golf ball at the same time as the ball is molded using a conventional injection mold or compression mold. This method eliminates the need for a separate marking step, provides a higher degree of freedom in the marking position than is possible with prior-art marking methods, and does not cause dimple deformation during marking. Hence, surface markings can be applied concurrent with the molding of a golf ball having a high uniformity in the dimple shapes and thus an excellent flight performance.

Another golf ball marking method according to the present invention comprises affixing a marking means to a surface of a covered body comprising a core enclosed within a pair of half-cups, then applying heat and pressure, within a compression mold, to the covered body to which the marking means has been affixed, so as to display the markings on the golf ball surface. In this way, the surface of a golf ball can be easily and efficiently marked while the ball itself is being molded.

Since golf balls have been marked at the same time as their molding according to the method of this invention, the dimples on the surface of the ball are subject to no deformation and thus remain uniform in shape. These golf balls have high quality and excellent flight performance.

BRIEF DESCRIPTION OF THE DRAWINGS

The objects, features and advantages of the invention will become more apparent from the following description of embodiments thereof, read in conjunction with the attached drawings.

DESCRIPTION OF THE PREFERRED EMBODIMENTS

The golf ball marking method of this invention carries out marking at the same time as molding of the ball in a conventional golf ball mold.

Figure 1:
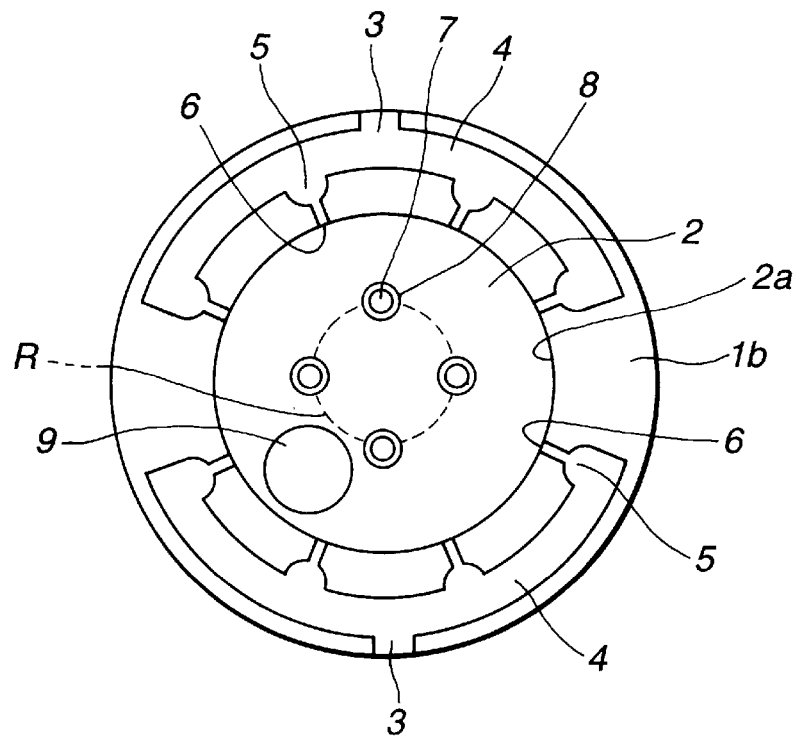
FIG. 1 is a top view of the lower half of a golf ball mold according to a first embodiment of the present invention, as seen from the parting line of the mold.
Figure 2:
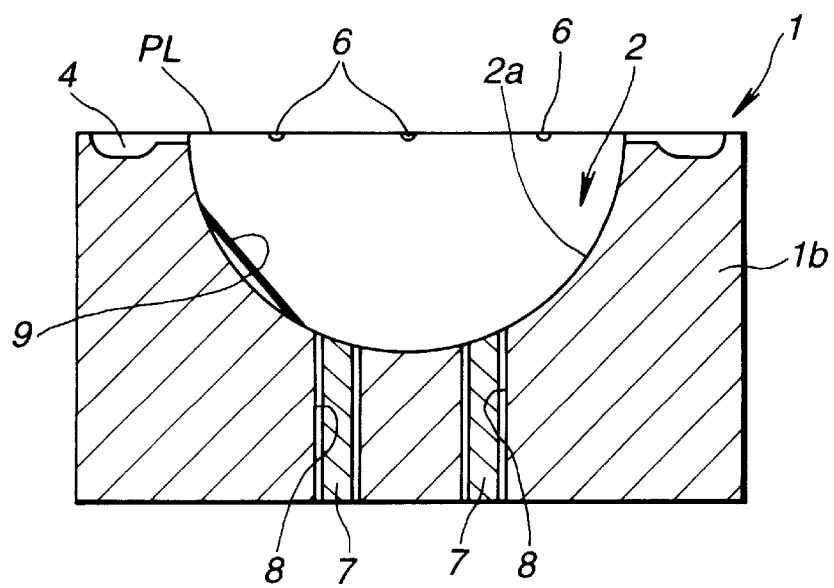
FIG. 2 is a sectional elevation view of the lower half of the mold in the same embodiment.

First Embodiment:

FIGS. 1 and 2 show only one side or a lower half 1b of a two-part mold 1 according to a first embodiment. Since the side of the mold that has been left out of the drawings, an upper half, has substantially the same structure as the lower half, a description of the upper half is omitted here.

When the two mold halves are removably joined, the mold 1 defines at the interior a spherical cavity 2 by its inner wall 2a. The cavity-defining wall 2a is provided with a plurality of dimple-forming projections (not shown).

The mold 1 has a parting line PL at a position corresponding to the equatorial plane which divides the spherical cavity 2 into two substantially equal parts. The mold is provided with main runners (inlets) 3 which communicate with a molding material feed source in the form of an injection molding machine (not shown), semi-annular runners 4, nozzles 5, and gates 6, which are in fluid communication in this order. These components are formed as grooves on the mold face at the parting line and constructed so as to become tubular when the upper and lower mold halves are joined, thus enabling the molding material to be supplied and injected into the cavity.

The use of two semi-annular runners 4, 4 is preferable for assuring that the injection pressure of the molding material into the cavity is uniform. However, other configurations may be used in place of this, including a single annular runner, or a plurality of three or more divided runners. In the illustrated embodiment, two half arcuate runners each have gates at four places located at equal intervals on the periphery of the runners, making for a total of eight gates.

Near the positions corresponding to both poles (north pole and south pole) of the spherical cavity 2, the mold 1 has, on an imaginary circle R centered at the poles, a plurality, and generally three to ten, support pins 7 for supporting the core or the center portion of the ball other than the cover (e.g., the core and an intermediate layer) at a central position in the cavity when the golf ball is injection molded. The support pins 7 are received in holes 8 extending through the mold wall in a direction perpendicular to the parting line or equatorial plane PL, so that the pins 7 may be moved into and out of the cavity 2. In the illustrated embodiment, four support pins 7 are provided at 90° intervals on the imaginary circle R, the total number of pins for both mold halves being eight.

In order to carry out marking at the same time as molding, a marking means 9 is provided on the cavity wall 2a of the mold prior to molding. The marking means 9 in this case is preferably a soft, clear film on which markings such as letters, numbers, figures, or symbols have been placed in ink. The film material used may be, for example, the same ionomer resin as the cover stock or a similar ionomer resin. The markings may be placed on this film by toner silk screen printing, gravure printing, ink jet printing, or using sublimation ink, for instance. The size of the film may be suitably adjusted, without particular restriction, according to the size of the markings to be applied. When the film is circular, the diameter is preferably about 10 to 20 mm and the thickness is preferably about 1 to 10 microns (um). When the cover stock is molded into the cover, the film integrally fuses with the surface of the cover stock on the ball, thereby becoming a portion of the cover stock.

The marking means 9 may be provided on the cavity-defining wall 2a at any position not in the vicinity of the support pins or the parting line. Film serving as the marking means may be provided on the cavity-defining wall at a suitable position according to such considerations as the purpose and use of the markings. To prevent the film from peeling off or shifting on account of the injection pressure of the molding material during injection molding, it is advantageous to affix the film to the cavity wall with an adhesive or the like.

Marking may also be carried out easily and efficiently by a marking means other than that described above involving the use of a film. For example, markings may be placed on the cavity-defining wall of the mold using such a process as direct pad printing or ink jet printing. Then the markings are transferred from the mold wall to the surface of the ball cover stock when the cover stock is molded.

The golf ball marking method of the invention that employs the injection mold 1 shown in FIGS. 1 and 2 may follow the same procedure as that used for the molding of golf balls in conventional injection molds. One exemplary procedure is described below by referring to a two-piece solid golf ball consisting of a core and a cover, for example.

First, a film 9 on which markings have been printed is disposed on the wall 2a of the mold cavity 2 at the marking position. Next, the core (not shown) is placed within the cavity 2 and held at the center thereof by the support pins 7. The cover stock is then fed from an injection molding machine (not shown) through the main runners 3, semi-annular runners 4, nozzles 5, and gates 6 and injected into the gap between the core and the cavity-defining wall 2a. Simultaneous with the completion of injection, the support pins are retracted to the wall. In this way, a golf ball having a plurality of dimples on the surface is molded. At the same time as molding, the film is integrally fused with the surface of the cover stock under the effect of the heat and pressure of the molding material that fills the gap between the core and the cavity-defining wall, whereby the markings on the film on the mold cavity wall is placed on the ball's surface.

The ball is then removed from the mold, which simultaneously completes both marking and molding of the ball.

Figure 3:
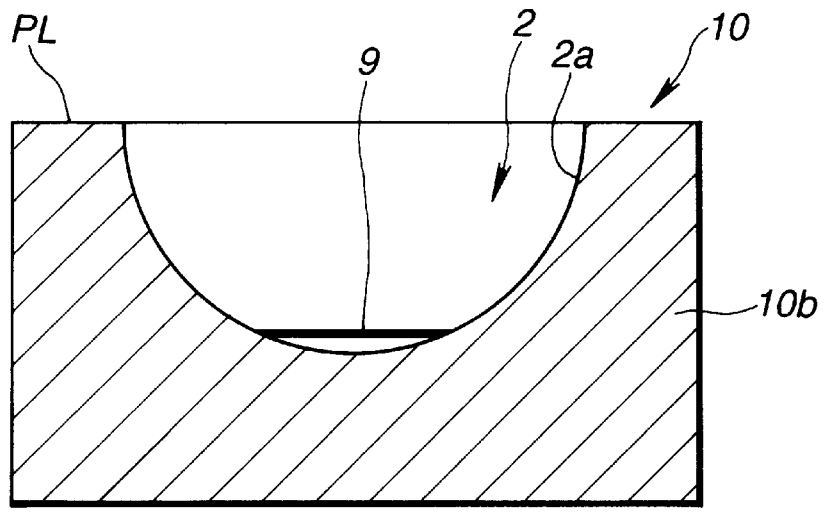
FIG. 3 is a sectional elevation view of the lower half of a golf ball mold according to a second embodiment of the invention.

Second Embodiment:

FIG. 3 is a sectional view of a lower half 10b of a compression mold 10 according to a second embodiment of the present invention. Since an upper half of the mold has substantially the same construction as the lower half, a description of the upper half is omitted here.

Other than having no gates at the parting line PL or runners connected thereto and having no support pins near the poles, this mold 10 has substantially the same construction as the injection mold of the first embodiment. Because support pins are unnecessary, marking is also possible at what would otherwise be the support pin positions (vicinity of the poles), thus further increasing the degree of freedom in the marking position. The same marking means may be used as in the first embodiment.

The inventive marking method using the mold shown in FIG. 3 is similar to a conventional golf ball molding method using a compression mold. Reference is similarly made to the molding of a two-piece solid golf ball consisting of a core and a cover, for example. First, a film 9 on which markings have been printed is disposed on the wall at the marking position of the cavity 2.

Next, the core is enclosed within a pair of half-cups that have been molded beforehand from cover stock, thereby forming a covered body. This covered body is placed within the mold cavity 2, the mold is closed, and a predetermined temperature and pressure are applied within the mold, thereby molding a golf ball having a plurality of dimples on the surface. The heat and pressure during molding cause the film to integrally fuse with the surface of the cover stock. As a result, the markings on the film on the cavity-defining wall of the mold are imparted to the ball's surface.

The ball is then removed from the mold, which completes both marking and molding at the same time.

Third Embodiment:

Another marking method of the present invention uses a compression mold like that in the second embodiment. A film on which markings have been printed is affixed as the marking means to the surface of a covered body comprising a core enclosed within a pair of half-cups. The covered body with the film affixed thereto is heated and compressed at a predetermined temperature and pressure within the compression mold to thereby integrally fuse the film to the surface of the ball for displaying the markings on the ball's surface.

This method enables marking to be administered efficiently since the marking means is affixed more easily and reliably to the surface of the covered body than to the cavity-defining wall.

In this embodiment, a film on which markings have been printed as in the first and second embodiments can be used as the marking means, and marking can be carried out by the same procedure as in the second embodiment. In an alternative procedure, marks are printed directly on the surface of the covered body, and the covered body with the marks printed thereon is heat compression molded.

The golf balls that have been marked at the same time as they are molded in this way are then trimmed of cover stock flash, following which the surface is painted, giving the finished product.

Figure 4:
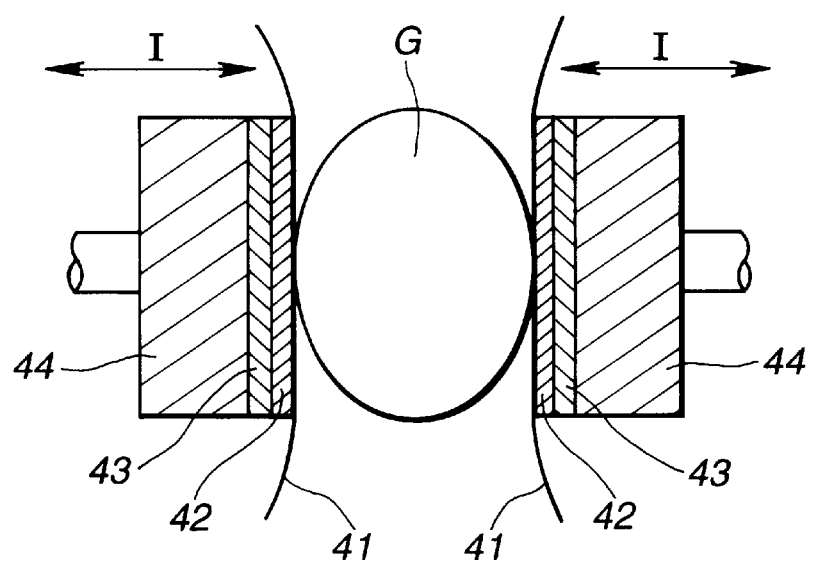
FIG. 4 is a schematic sectional view showing a prior-art marking method.

As explained above, the marking methods of this invention are able to avoid the undesirable effects of prior-art marking methods such as that depicted in FIG. 4, wherein transfer is effected by strongly pressing the dimpled curved surface of the ball at an elevated temperature, causing deformation of the dimples during transfer. In these prior-art marking methods, even after transfer is completed, the dimples do not revert completely to their original shape, remaining instead deformed. As a result, the uniformity of the dimple shapes on the ball's surface is lost, which in turn compromises the ball's flight performance.

Moreover, compared with prior-art methods, the inventive marking methods provide a greater degree of freedom in the marking position. In addition, they allow direct use without modification of the injection molds and compression molds that are customarily used for molding golf balls. Also, marking is effected at the same time as the ball is molded, making it possible to eliminate a separate marking step, which further enhances the convenience.

In golf balls that were marked by the method of this invention at the same time as they were molded, the dimples on the ball's surface have not been deformed and are thus uniform in shape, giving the ball an excellent flight performance.

No particular limit is imposed on the construction of golf balls on which the marking method of this invention is practiced. Hence, the inventive method may be practiced, for example, on solid golf balls including one-piece, two-piece and multilayer structure golf balls, or thread-wound golf balls.

The golf ball marking method of this invention is thus able to easily and efficiently apply markings to golf balls without compromising the uniformity of the dimple shapes.

Japanese Patent Application No. 363591/1997 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. A golf ball marking method which imparts markings to a golf ball surface comprising cover stock, said method comprising the steps of:
furnishing a two-part mold having an inner wall provided with a plurality of dimple-forming projections and defining a spherical cavity and parting at a position that corresponds to an equatorial plane and that divides the cavity into two substantially equal parts,
providing a mark-bearing film on the cavity-defining wall of the mold, said mark-bearing film being formed from the same material as the cover stock, and
filling the mold cavity with a molding material of the cover, and forming dimples on the surface of the cover and at the same time marking the golf ball by causing the film to integrally fuse with the surface of the cover stock.

2. The marking method of claim 1, wherein the mold is an injection mold.

3. The marking method of claim 1, wherein the mold is a compression mold.

4. A golf ball marking method which imparts markings to a golf ball surface consisting of cover stock, comprising the steps of:
furnishing a compression mold having an inner wall defining a spherical cavity and parting at a position that corresponds to an equatorial plane and that divides the cavity into two substantially equal parts,
affixing a marking means to a surface of a covered body comprising a core enclosed within a pair of half-cups, wherein a pair of half-cups have been molded beforehand from cover stock and the marking means is a mark-bearing film formed from the same material as the cover stock;
placing the covered body within the cavity of the compression mold,
applying heat and pressure within the compression mold to the covered body to which the marking means has been affixed, and
molding the golf ball to have a plurality of dimples on its surface and at the same time to mark the golf ball by causing the film to integrally fuse with the surface of the cover stock.

5. A golf ball marking method which imparts markings to a golf ball surface consisting of cover stock, comprising the steps of:
furnishing a compression mold having an inner wall defining a spherical cavity and parting at a position that corresponds to an equatorial plane and that divides the cavity into two substantially equal parts,
providing a marking means on the cavity-defining wall of the mold which is a mark-bearing film formed from the same material as cover stock,
placing a covered body comprising a core enclosed within a pair of half-cups, within the cavity of the compression mold, wherein a pair of half-cups have been molded beforehand from cover stock,
applying heat and pressure within the compression mold, and
molding the golf ball to have a plurality of dimples on its surface and at the same time to mark the golf ball by causing the film to integrally fuse with the surface of the cover stock.

6. The marking method of claim 1, wherein said marking placed on the film is selected from letters, numbers, figures and symbols.

7. The marking method of claim 1, wherein said mark-bearing film has a thickness of 1 to 10 microns ($\mu$m).

8. The marking method of claim 1, wherein said mark-bearing film is circular and has a diameter of 10 to 20 mm.

9. The marking method of claim 1, wherein the two-part mold has a plurality of support pins near the positions corresponding to north and south poles of the spherical cavity which are moved into and out of the cavity for supporting the core or the center portion of the ball other than the cover and said mark-bearing film is provided at a position not in the vicinity of the support pin.

10. The marking method of claim 1, wherein the core is placed within the cavity and held at the center thereof by the support pins and the cover stock is injected into a gap between the core and a cavity-defining wall.

11. The marking method of claim 1, wherein the film material and the cover stock are ionomer resin.

12. A golf ball comprising a core and cover, said cover having an outer surface with dimples formed thereon and comprising a cover stock, said outer surface having markings formed thereon by a method comprising the steps of:

furnishing a two-part mold having an inner wall provided with a plurality of dimple-forming projections and defining a spherical cavity and parting at a position that corresponds to an equatorial plane and that divides the cavity into two substantially equal parts, providing a mark-bearing film on the cavity-defining wall of the mold, said mark-bearing film being formed from the same material as the cover stock, and filling the mold cavity with a molding material of the cover, and at the same time dimples are formed on the surface of the cover marking the golf ball by causing the film to integrally fuse with the surface of the cover stock.

13. A golf ball comprising a core and cover, said cover having an outer surface with dimples formed thereon and comprising a cover stock, said outer surface having markings formed thereon by a method comprising the steps of:

furnishing a compression mold having an inner wall defining a spherical cavity and parting at a position that corresponds to an equatorial plane and that divides the cavity into two substantially equal parts, affixing a marking means to a surface of a covered body comprising a core enclosed within a pair of half-cups, wherein a pair of half-cups have been molded beforehand from cover stock and the marking means is a mark-bearing film formed from the same material as the cover stock;

placing the covered body within the cavity of the compression mold, applying heat and pressure within the compression mold to the covered body to which the marking means has been affixed, and molding the golf ball to have a plurality of dimples on its surface and at the same time to mark the golf ball by causing the film to integrally fuse with the surface of the cover stock.

\* \* \* \* \*